United States Patent [19]
Benner et al.

[11] 3,881,457
[45] May 6, 1975

[54] FUEL PICK-UP BAFFLE

[75] Inventors: Robert J. Benner, Lansing; Roger J. Lundquist, Grand Ledge, both of Mich.

[73] Assignee: General Motors Corporation, Detroit, Mich.

[22] Filed: May 9, 1974

[21] Appl. No.: 468,500

[52] U.S. Cl. .............. 123/136; 137/574; 220/20
[51] Int. Cl. ............................................. B65d 87/12
[58] Field of Search......... 123/136; 220/20, 22, 1 B, 220/1 T; 222/564, 464; 137/574, 576

[56] References Cited
UNITED STATES PATENTS

| | | | |
|---|---|---|---|
| 3,020,950 | 2/1962 | Schrhivogel | 137/574 |
| 3,049,171 | 8/1962 | Neuerburg et al. | 137/574 |
| 3,552,596 | 1/1971 | Landon | 220/22 |

*Primary Examiner*—Charles J. Myhre
*Assistant Examiner*—Paul Devinsky
*Attorney, Agent, or Firm*—J. C. Evans

[57] ABSTRACT

A fuel supply system for an internal combustion engine includes a main tank with an open ended baffle container supported on the bottom of the main tank with its major lateral axis located at the intersection of predetermined minimum fuel grade lines in the main tank. A pair of conduits formed diagonally across the base of the baffle container communicate the main tank and the open ended container and fuel therein is responsive to vehicle acceleration or deceleration to trap a secondary fuel supply within the open ended container for supply to the inlet end of a fuel pick-up tube located interiorly of the open ended container. An inlet strainer is located across the rear planar extent of the base of the open ended container to wick fuel from the corner positions of the baffle to the pick-up tube during lateral vehicle maneuvers.

4 Claims, 5 Drawing Figures

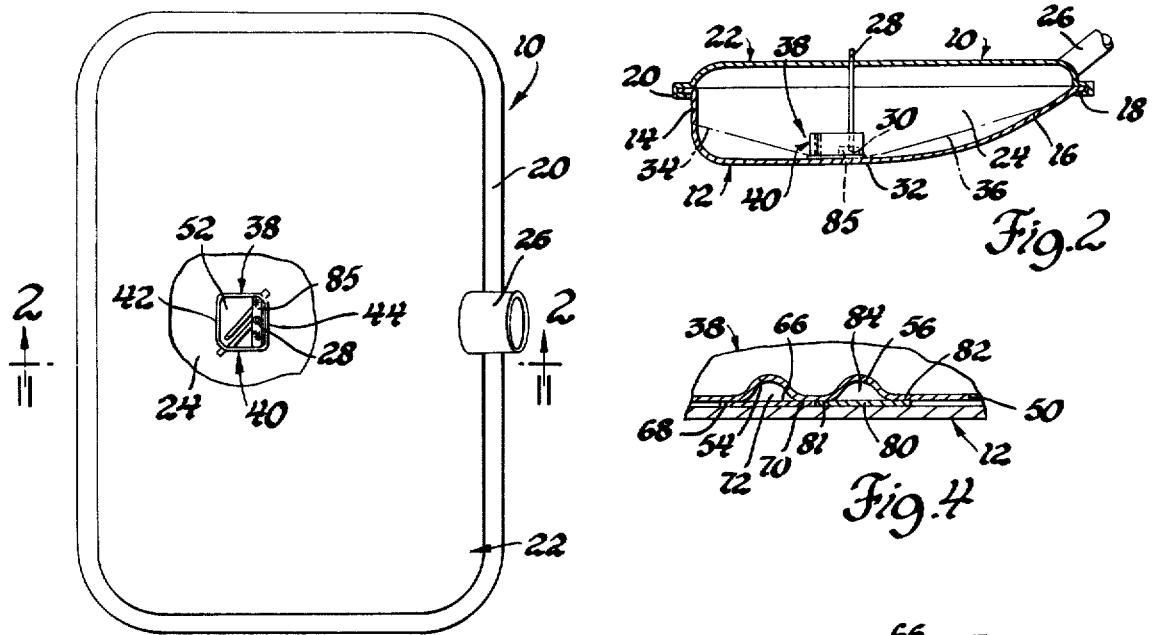
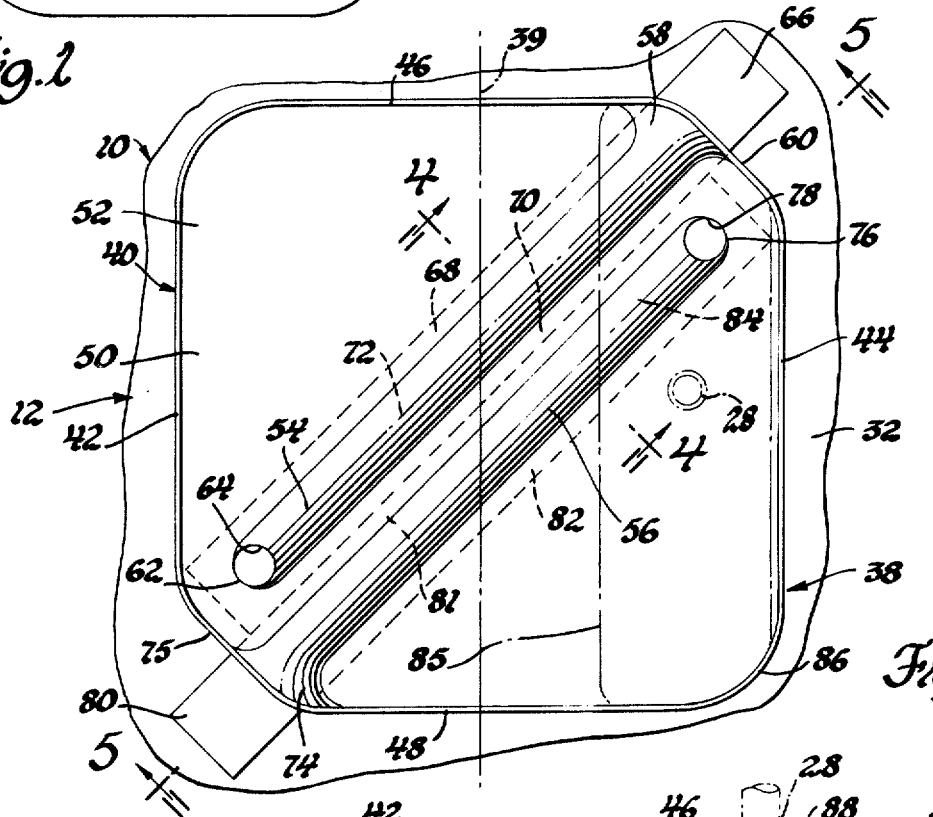
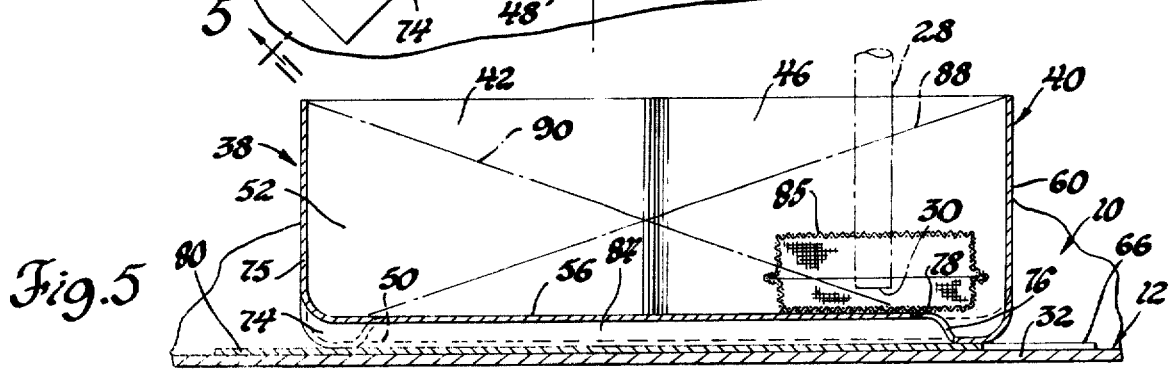

FUEL PICK-UP BAFFLE

This invention relates to vehicle fuel supply systems including a fuel pick-up baffle on the bottom of the tank and more particularly to such arrangements wherein means are included to maintain an assured supply of fuel to a pick-up tube under dynamic vehicle operations.

In fuel supply systems for a vehicle the intake fuel pick-up tube or suction pipe of the fuel supply is located adjacent the bottom of the fuel tank to draw fuel therefrom. Baffle means are provided in surrounding relationship to the intake or suction pipe to provide a source of fuel for the suction pipe under dynamic vehicle operation that otherwise can shift a minimum fuel supply in the main tank out of fluid communication with the inlet end of the suction pipe. In such arrangements, lateral acceleration of the vehicle can cause the fuel to shift into one corner of the baffle arrangement thereby to leave the fuel pickup tube without fuel.

Accordingly, an object of the present invention is to improve the supply of fuel to a fuel pickup tube in a main fuel tank during vehicle maneuvering operations under minimum fuel level conditions by the provision of an open ended baffle container in the main tank having a fuel pick-up tube located in the rear half of the container and by the further provision of an inlet strainer that occupies substantially the rear half volume of the open ended container to wick fuel from opposite corners thereof during lateral vehicle maneuvers thereby to maintain an assured fuel supply to the fuel pick-up tube.

Still another object of the present invention is to improve the flow of fuel from a main fuel tank under low fuel conditions and dynamic vehicle operation by locating an open ended, shallow baffle container at the intersection of predetermined low fuel grade lines in the main tank and by the further provision of a pick-up tube located in the rear half of the open ended baffle container to improve fuel supply thereto under vehicle upgrade and acceleration maneuvers and wherein a fuel strainer is located within the rear volume of the open ended container to wick fuel from the corners thereof during lateral maneuvers and wherein fuel supply conduits are located at multiple points around the baffle container to assure filling of a secondary fuel chamber within the open ended baffle container and wherein the conduit paths into the open ended container are configured to produce a dynamic pressure head in response to vehicle maneuvers to prevent the escape of fluid from the open container during fore-aft and lateral vehicle maneuvers.

Still another object of the present invention is to provide a simplified fuel tank baffle for use in a main fuel tank of a vehicle fuel supply including a generally rectangularly configured open ended baffle container having a pair of depressions formed in the base thereof diagonally to the major lateral axis of the base covered by means to define first and second flow paths for filling the container with fuel from the main tank and wherein each depression is intersected by an outlet port in communication therewith formed in the base of the container inwardly of one of its corners and each depression having a diagonally opposite inlet with a fluid conduit being formed between the inlet and outlet port to produce a differential pressure therebetween in response to fore-aft and lateral maneuvers thereby to prevent fluid flow through the outlet ports to assure a supply of fuel to a pick-up tube disposed within the interior of the open ended baffle container adjacent the intersection of minimum fuel fill lines within the main tank.

Further objects and advantages of the present invention will be apparent from the following description, reference being had to the accompanying drawings wherein a preferred embodiment of the present invention is clearly shown.

In the Drawings:

FIG. 1 is a view in top elevation of a gas tank, partially broken away showing the baffle assembly of the present invention on the bottom of the tank;

FIG. 2 is a vertical sectional view taken along the line 2—2 of FIG. 1, looking in the direction of the arrows;

FIG. 3 is an enlarged top elevational view of the baffle assembly of the present invention;

FIG. 4 is a vertical sectional view taken along the line 4—4 of FIG. 3, looking in the direction of the arrows; and FIG. 5 is a vertical sectional view taken along the line 5—5 of FIG. 3 looking in the direction of the arrows.

Referring now to the drawings, in FIG. 1 a gas tank 10 is illustrated including a lower housing 12 having a front wall 14 and a generally upwardly curved rear wall 16. A peripheral flange 18 on the lower housing 12 is joined to an inwardly turned flange 20 on a tank cover 22 to define a primary fuel chamber 24.

The cover 22 includes a filler neck 26 connected thereto for filling the primary fuel chamber 24. A fuel pick-up tube/suction pipe 28 is directed through the cover 22 and includes an inlet opening 30 thereon located above the bottom 32 of tank 10.

A fuel supply problem can exist under vehicle maneuvering operations wherein a minimum fuel supply is shifted fowardly and aft or laterally within the main tank 10 in response to vehicle acceleration or deceleration or changes in the tank attitude because of grade changes that can tilt the tank 10 either fore or aft. A representative minimum fuel grade is illustrated at reference numeral 34 which represents the position that a minimum fuel fill within the main tank, for example a fuel fill of 2 gallons, will assume when the vehicle is braked so as to cause the fuel to shift forwardly within the main tank against the forward wall 14 thereof. Such fuel position will also occur under conditions wherein the vehicle is moving down a grade in the order of 27 percent grade.

Likewise, a second minimum fuel grade line 36 is illustrated in FIG. 2 that represents a fuel grade line which will be assumed by a minimum fuel fill in the order of two gallons when the vehicle is accelerated or under conditions where the vehicle is moving up a predetermined grade in the order of 27 percent grade.

In the illustrated case, such a shifting movement of fuel to assume the grade fuel lines 34, 36 will cause the fuel supply in the primary fuel chamber 24 to be moved out of communication with the inlet end 30 of the pick-up tube 28.

In order to provide an assured supply of fuel to the pick-up tube 28 under conditions wherein a minimum fuel supply will assume the grade lines like those shown at 34, 36, an open-ended baffle container 38 is located with its main lateral axis 39 along a line drawn through the intersection of predetermined minimum fuel grade lines such as illustrated at 34 and 36 on the bottom 32 of the tank housing 12. The baffle container 38 more particularly includes a generally rectangularly configured side wall 40 with a front segment 42 located in spaced parallelism with the front wall 14 of the tank 10 and a rear wall segment 44 located in spaced parallelism with the rear wall 16 of the tank 10. The container further includes side wall segments 46, 48 joining the opposite ends of the forward and rear wall segments 42, 44. The side wall 40 is integrally formed with a base 50 to define an open-ended secondary fuel chamber 52 that is in direct communication with the primary fuel chamber 24 when the fuel level therein, under level conditions, is above the vertical height of the side wall 40. When the fuel level is lower than the height of the side wall 40, fuel supply to chamber 52 is produced by fuel supply means including a pair of parallel, inwardly deformed ridges 54, 56 in the base 50 that extend diagonally with respect to axis 39. The ridge 54 extends from an open end 58 thereof at a first corner 60 of the container 38 to a closed end 62 formed in base 50. At the closed end 62, the base 50 has a vertical opening 64 formed therein. The ridge 54 is enclosed by an elongated, generally rectangularly configured strap 66 that is soldered along spaced parallel lines 68, 70 to the base 50 of the container 38 thereby to define a conduit 72 between the opening 58 which defines the inlet to conduit 72 and the opening 64 which defines the outlet of conduit 72 for flow of fluid from the chamber 24 to the secondary fuel chamber 52 within the baffle container 38.

Likewise, the ridge 56 is formed diagonally across the base 50 of the container 38 between an inlet opening 74 at a corner 75 located diagonally opposite the corner 60 and a closed end 76 that is adjacent an outlet opening 78 formed in the base 50 immediately inwardly of the corner 60. The ridge 56 is enclosed by an elongated generally rectangular plate 80 that is soldered to the base 50 at spaced apart longitudinal edges 81, 82 therealong to define a fuel flow conduit 84 from the opening 74 to the outlet opening 78 for supplying fuel from the main chamber 24 to the secondary chamber 52 within the container 38.

As is best seen in FIG. 3, the pick-up tube 28 has the inlet end 30 thereof located approximately midway between the major lateral axis 39 and the rear wall segment 44. It is connected to a generally rectangularly configured inlet strainer 85 that extends across the planar extent of the rear half of the container 38 and extends between corner 60 and an oppositely located rear corner 86.

In vehicles with the engine located forwardly of the fuel tank, this arrangement of the fuel filter or strainer 85 and pick-up inlet 30 produces a wick action to pick up fuel from the corners 60, 86 of the baffle container 38 during lateral vehicle maneuvers. The pick-up location in the rear half of the baffle container 38 is preferred because upgrade and acceleration maneuvers require a greater quantity of fuel supply to the pick-up tube 28 than do deceleration and downgrade maneuvers. The fuel fill conduits 72, 84 define a plurality of inlets for flow of fluid from around the pick-up area to assure a positive fill of the chamber 52 under conditions where there is a minimum amount of fuel in the tank chamber 24.

The more efficient fuel pick-up produced by use of a horizontally disposed strainer 85 for the pick-up tube 28 enables the baffle container 38 to have a smaller cross sectional planar extent and a smaller space for chamber 52 to supply an assured flow of fuel from the baffle container 38 to the pick-up 28 during acceleration and upgrade vehicle maneuvers.

The provision of a plurality of conduits into the chamber 52 results in a quick refill recovery by passage of fuel from the chamber 24 into the chamber 52 when dynamic forces acting on the tank 10 are balanced and when the fuel level in the chamber 24 covers the bottom of the fuel tank in the baffle area.

Because of the directional location of the conduits 72, 84, fuel will be supplied from the container 38 during acceleration, braking and various grade maneuvers. For example, under acceleration conditions where a minimal fuel supply will assume the fuel grade line shown at 36, the inlet 58 at the corner 60 of the container 38 will be disposed beneath a predetermined head of fuel which will flow through the conduit 72 and the outlet opening 64 into the chamber 52. The oppositely directed diagonal passage defined by the conduit 84, under this mode of operation, will have the fuel supply therein forced from the opening 74 in the direction of the outlet 78 to produce a dynamic fuel pressure at the outlet 78, as generated by this vehicle maneuver, so as to prevent the drainage of fuel from within the container 38 outwardly through the conduit 84. During this maneuver, fuel in chamber 52 is inclined from the base 50 to the top of rear wall segment 44 to uncover the oppositely located outlet 64 to prevent drainage of fuel outwardly through conduit 72.

During acceleration vehicle maneuvers fuel within the chamber 52 will be shifted to the grade line shown at 88 in FIG. 5 so as to maintain a substantial head of liquid on the inlet 30 to pick-up tube 28.

When the vehicle is braked or decelerated, a minimum fuel quantity within the main chamber 24 will assume the fuel grade line shown at 34. At the same time, the fuel fill within the secondary fuel chamber 52 will assume the grade line shown at 90 in FIG. 5. The fuel within the fluid conduit 72 will be accelerated in the direction of the outlet 64 so as to prevent drainage of fuel accumulated against the forward wall segment 42 outwardly of conduit 72 into the chamber 24. At the same time, the fuel fill within chamber 52 will uncover the outlet 78 to prevent drainage from chamber 52 through conduit 84. The pick-up location in the rear half of the baffle container 38 under deceleration and downgrade maneuvers will have a lesser level of liquid to supply the pick-up tube 28 but this fluid supply assures an adequate quantity of fuel under this mode of operation.

By virtue of the aforedescribed arrangement, quick refill recovery is maintained because of relatively unrestricted openings 64, 78 into the secondary fuel chamber 52. These outlet openings may be maintained as large as desired without detracting from the capability of the baffle arrangement to retain the fuel during maneuvering. This is due to the maintenance of a dynamic fuel pressure in one or the other of conduits 72, 84 and due to the fact that the shifted fuel fill within the secondary fuel chamber 52 is located so as to uncover the oppositely located outlet hole. Because of this arrangement, the secondary fuel supply within the chamber 52 is substantially trapped therein during the vehicle maneuvering. Because the secondary supply of fuel is trapped within the baffle container 42 during vehicle maneuvering and because the arrangement of the filter 85 optimizes pick up of fuel from the corners of the baffle container 42, especially under vehicle acceleration and upgrade maneuvers, the wall height of the baffle container 42 can be minimized. This enables the secondary fuel chamber 52 to be more readily refilled from the main tank chamber 24 by fuel slosh which occurs therein under minimum fuel fill conditions therein.

While the embodiments of the present invention, as herein disclosed, constitute a preferred form, it is to be understood that other forms might be adopted.

What is claimed is:

1. A fuel supply system comprising a tank having means including a tank bottom to define a main fuel chamber, a baffle container having a base located on the bottom of said tank, said container having a generally rectangular configuration to define a second fuel chamber within said tank, said baffle container including an upper open end and a peripheral sidewall having a height less than that of said tank, a fuel pick-up tube having an inlet end thereof located adjacent the base of said baffle container for drawing fuel from said second chamber, a pair of parallel conduits extending diagonally of said baffle container base, one of said conduits including an inlet located outside of one corner of said baffle container within said main tank and including an outlet located inside of an opposite corner of said baffle container, the other of said conduits including an inlet located outside of said opposite corner and including an outlet therefrom located inside of said one corner, said conduits serving to fill said second chamber with fuel from said main tank chamber when the fuel supply in the main tank is below the height of said sidewall and dynamic forces on the fuel supply are balanced, fuel within said conduits being responsive to vehicle maneuvers to produce a back pressure against fuel flow from within said secondary chamber to said main fuel chamber thereby to maintain an assured supply of fuel to the fuel pickup tube during vehicle maneuvers wherein a minimum fuel supply in the main tank is located out of communication with the fuel pickup tube.

2. A fuel supply system for a vehicle comprising: a main fuel tank having front and rear portions thereon interconnected by a tank bottom for containing a first main fuel supply, a baffle container located on the bottom of said main tank including an open ended upper portion and a base portion thereon supported on the bottom of the main tank and including a peripheral wall thereon having a height less than the vertical height of the main tank, means for directing fuel into said baffle container for passing a secondary fuel supply thereto from the main tank, said means including first and second conduits formed diagonally to the major lateral axis of said container, said first conduit including an inlet located on the peripheral wall of the baffle container at one corner thereof, said first conduit including an outlet thereon located inwardly of the peripheral wall at an opposite corner thereon from said inlet opening of said first conduit to define a conduit length therebetween to produce a dynamic pressure drop for preventing reverse fuel flow between the inlet and outlet during a first predetermined vehicle maneuver, said second conduit including an inlet located at the peripheral wall of said baffle at said opposite corner, said second conduit including an outlet therefrom to container located within said baffle at the peripheral wall thereof at a point opposite to the outlet of said first conduit, said second conduit having a length between the inlet and outlet thereof to produce a dynamic pressure drop therebetween to prevent reverse fuel flow between the outlet and inlet of said second conduit during a second vehicle maneuver, a fuel pick-up tube directed interiorly of said main tank and including an inlet end thereon disposed within said baffle container to draw fuel from the secondary fuel therefrom as supplied from said main fuel supply during normal vehicle operations, said first and second conduits being operative to prevent reverse flow of secondary fuel from the baffle container during vehicle movements wherein secondary fuel within said baffle is shifted to uncover one of said outlets and is shifted into overlying relationship with the other of said outlets thereby to assure a supply of fuel to the fuel pick up during vehicle maneuvers.

3. A fuel tank supply system for a vehicle comprising: means for enclosing a main fuel supply including a forward and rear wall portion joined by a tank bottom, an open ended container having a base portion thereon located within said tank on the bottom thereof, said open ended container having a generally squared cross configuration to define a secondary fuel sump within said tank, said container having a major lateral axis thereof located at an intersection point of predetermined low fuel grade lines within the main fuel tank between the front and rear wall portions thereof, a fuel pick-up tube directed inwardly of said main tank and including an inlet end thereon disposed within said open container approximately at the midpoint between the lateral major axis through said container parallel to the front and rear walls of said main tank, an inlet strainer supported on the base of said open-ended container at the rear half thereof extending to the rear corners of said container and covering the inlet end of said fuel pick-up tube to produce a wicking action for fuel flow from corners of said open-ended container into said inlet end of said pick-up tube, a pair of parallel conduits located on the underside of said open container formed diagonally to said lateral axis, each of said conduits including an inlet located outwardly of a corner of said open-ended container in communication with the fuel supply in said main tank, each of said conduits further including an outlet thereon located inwardly of an opposite corner of said open container to define a conduit length between the inlet and outlet of said conduits to produce a differential pressure therein upon fluid acceleration therethrough during vehicle maneuvers, said conduits serving to direct a secondary fuel supply from the main tank into the open ended container during vehicle operation with balanced dynamic forces, said conduits being operative during fore and aft vehicle acceleration to prevent drainage of fuel from within said open ended container to said main tank whereby said pick-up tube is located below a fuel level within said open-ended container during vehicle maneuvers thereby to draw fuel from the fuel trap therein by said parallel conduits.

4. A vehicle fuel supply system comprising: a main fuel tank including means for enclosing a main fuel supply including a forward and rear wall joined by a tank bottom, an open-ended container having a base portion thereon supportingly received on said tank bottom, the base of said open ended container having a pair of diagonal ridges formed therein diagonally thereacross, each of said ridges being formed inwardly of the base of said open ended container, means for closing said ridges to form fuel conduits, one of said conduits having an open end in communication with the main tank at one corner of said open-ended container and being closed at the opposite end thereof, an opening in the base of said open-ended container adjacent one corner thereof in communication with said one conduit to define a fixed length flow path to produce a pressure differential on fluid movement therethrough from the inlet end and the outlet opening therefrom produced by a first predetermined vehicle maneuver, another of said conduits having an inlet opening at the opposite corner of said open-ended container, an outlet opening in the base of said open ended container in communication with another of said conduits to define a fixed length flow path for producing a pressure differential thereacross upon fluid movement between said inlet opening and outlet of said another conduit produced by a second vehicle maneuver, a fuel pick-up tube directed through said main tank including an open inlet thereon in communication with the interior of said open-ended container, an inlet strainer located between the rear wall of said open-ended container and the mid-lateral axis thereof to produce a pick up of fuel from within said open-ended container for supply to said pick-up tube, said conduits to trap a secondary fuel supply within said open-ended container during vehicle maneuvers to produce an assured supply of fuel from within the open ended container to the inlet end of said pick-up tube during fore and aft vehicle maneuvers causing the fuel supply in said open ended container to shift between the front and rear walls thereof.

* * * * *